March 7, 1967  J. CORRIGAN  3,307,916
RENDERING APPARATUS

Filed Dec. 18, 1962  2 Sheets-Sheet 1

INVENTOR.
JOSEPH CORRIGAN
BY
Wilfred J Baranick
ATTORNEYS

March 7, 1967 J. CORRIGAN 3,307,916
RENDERING APPARATUS
Filed Dec. 18, 1962 2 Sheets-Sheet 2

INVENTOR.
JOSEPH CORRIGAN
BY
*Wilfred J. Baronick*
ATTORNEYS

United States Patent Office 3,307,916
Patented Mar. 7, 1967

3,307,916
RENDERING APPARATUS
Joseph Corrigan, Newton Center, Mass., assignor to J. C. Corrigan Co., Inc., Boston, Mass., a corporation of Massachusetts
Filed Dec. 18, 1962, Ser. No. 245,462
2 Claims. (Cl. 23—280)

The present invention relates to novel methods of and apparatus for operating a tallow rendering plant as associated with the meat packing industry or as a separate independent rendering plant. More specifically, the invention is concerned with a rendering operation for inedible animal products to separate the tallow and crackling whereby the consistency and ingredients of the end products may be closely controlled and wherein a minimum of manpower is required for operation of the equipment.

It is the usual procedure in the rendering of tallow in both of the above-mentioned types of plants to crush, shred or pulverize the animal materials such as bones, hoofs, horns, etc., which are to be used and to heat this material to a temperature high enough to soften or liquefy the tallow, which is thereby separated and drained off from the remaining matter. The raw materials are commonly delivered to the shredder machine by conveyor from the kill floor, when the rendering operation is in conjunction with a slaughter house, or from the bulk containers in which it is received, in the case of a separate rendering plant. The materials may be washed before shredding depending on the nature of the desired end products. The shredded materials are then heated in large cookers which discharge into some means for straining or otherwise separating the liquid tallow from the remaining "crackling." The tallow may be further purified by centrifuging or other means, and the crackling further dried, often by presses or expellers which force the moisture from the crackling.

According to the rendering process of the present invention the raw materials may be delivered to the shredder by a screw conveyor either directly from the trucks or other means in which it is received or in a totally enclosed chute directly below the kill floor. The material discharged by the shredder is transported by a second conveyor to one or more holding bins with the live bottoms, that is, bottoms in which substantially all of the bottom area is conveyorized, and top leveling screws. The bin (or bins) is of special design so that no hang-up or bridging can occur. A plurality of cookers may be supplied with material from the holding bin. Twin bottom screws discharge for a preset time or a preset volume, a quantity sufficient to fill each cooker. Automatic means are provided to control cooking time, assuring consistent and correct cooking. The free tallow and wet crackling are discharged from the cookers into a special, perforated drain trough, where the tallow is allowed to flow through the perforations into an inclined drain pan located below the trough. The small particles of solid material, or fines, which also pass through the perforations in the trough are retained, for the most part, in the drain pan as the tallow drains off and is pumped to a surge and storage tank. From the storage tank the tallow is injected into a centrifuge which discharges the tallow, now of extreme clarity, from one end while discharging the remaining fines from the other end.

The tallow drain trough is fitted at the bottom with a pair of spirals which exert a pressing and agitating effect on the crackling while discharging it from the trough, thus resulting in improved drainage and dryer crackling. Means are also provided for reclaiming the fines which pass through the perforations in the trough. The majority of these fines remain in the drain pan when the tallow flows out. A horizontal and an inclined screw are provided to convey these fines, or any desired portion thereof, back into the trough to be mixed again with the crackling before being discharged to a press or expeller which forces out more tallow. When substantially all the tallow has been removed an end product of crackling which contains a predetermined proportion of reclaimed fines is left. This material, which is useful as fertilizer and animal feeds, may then be packaged or stored in bulk tanks. Although in conventional processing the fines may again be mixed with the crackling at the press an extra drainage is provided by the present invention with no material increase in handling or equipment since the fines would have to be delivered from the drain pan to the press in any event. Since the fines are returned to the drain trough, a substantial amount of the tallow which remains thereon after removal from the drain pan is allowed to drain off before the crackling and fines reach the press. This results in appreciably less pressing time and better operation of the press.

It is a principal object of the present invention to provide a novel process of rendering tallow which is economical, reliable, adaptable to many situations, and provides an end product or products having properties which may be carefully controlled.

It is a further object of the invention to provide an embodiment of novel apparatus suitable for carrying out such a process.

Another object is to provide tallow rendering apparatus which reclaims the fines passing through the straining means with the free tallow by returning them to the straining means before delivery to a press or expeller.

A still further object is to provide a novel method of rendering tallow whereby an end product of dry crackling containing a desired proportion of fines may be obtained.

Other objects of the invention will in part be obvious and will in part appear hereinafter.

The invention accordingly comprises the process involving the several steps and the relation and order of one or more of such steps with respect to each of the others and the apparatus possessing the construction, combination of elements and arrangement of parts which are exemplified in the following detailed disclosure, and the scope of the application of which will be indicated in the claims.

For a fuller understanding of the nature and objects of the invention, reference should be had to the following detailed description taken in connection with the accompanying drawings wherein.

Figure 1:
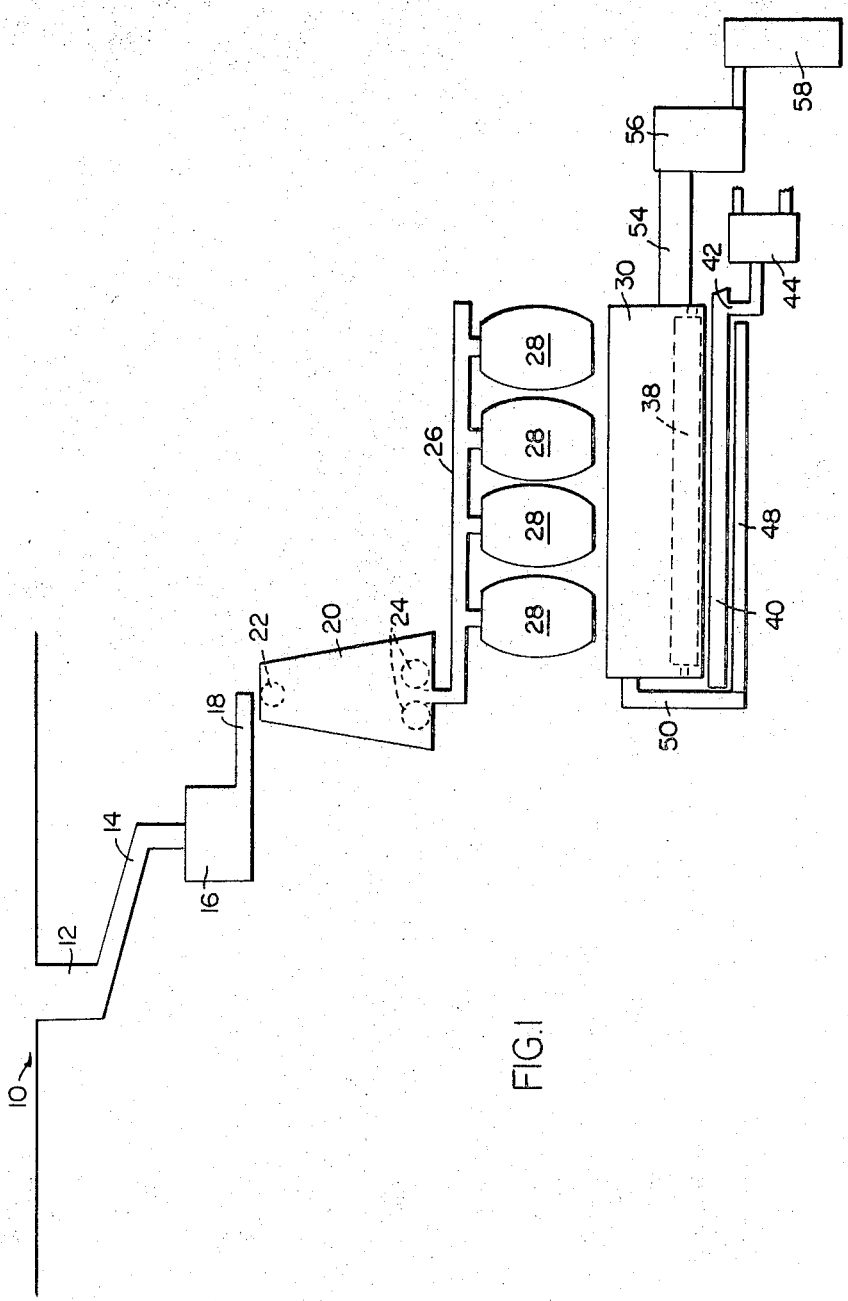
FIGURE 1 illustrates diagrammatically the various elements of equipment and the operations performed thereby from raw materials to end products.
Figure 2:
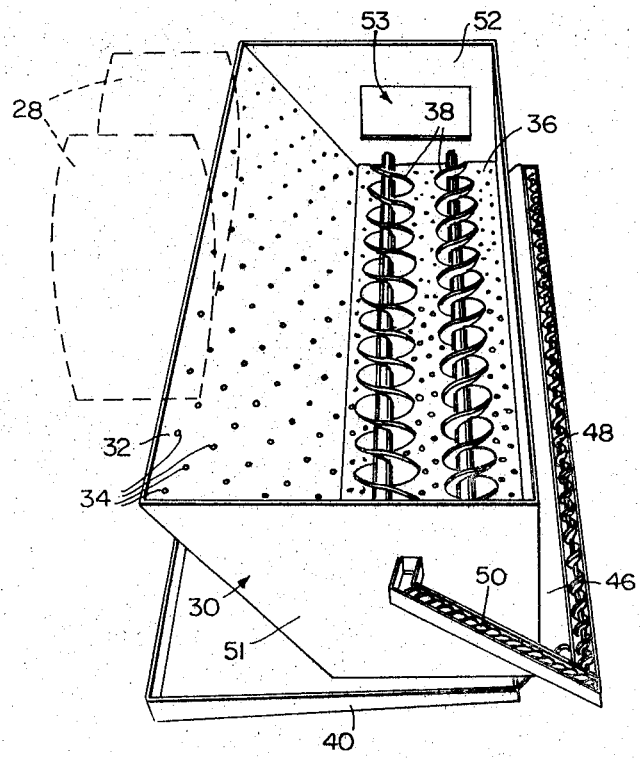
FIG. 2 is a top perspective view, also somewhat diagrammatic, of certain elements of the apparatus of FIGURE 1.
Figure 3:
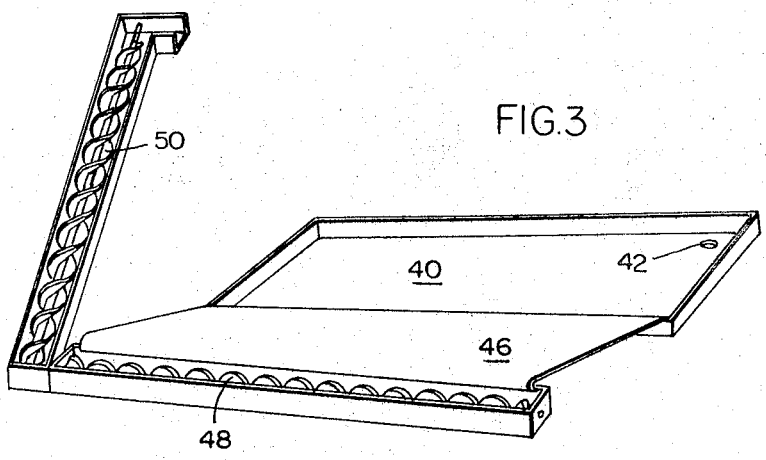
FIG. 3 is a side perspective of certain elements of FIG. 2.

Referring now to the drawings, the numeral 10 denotes figuratively the kill floor of a slaughter house or other source from which the raw materials are received. The waste materials from the dead stock slide through an opening into an enclosed chute 12 which communicates with screw conveyor 14. A shredder machine 16 receives the raw material from conveyor 14 and crushes, shreds, or pulverizes it into small pieces. Conveyor 18 transports the pulverized material from the bottom discharge of shredder 16 to holding bin 20. A top screw 22 levels the material in bin 20 to full capacity and a conventional high level control may be provided to protect against overloading. It will be noted that the sides of bin 20 slant outwardly from top screw 22 to twin bottom discharge screws 24, thus preventing any possibility of hang-up or bridging. A suitable conveyor system, denoted generally by the numeral 26, transports the material from holding bin 20 to a plurality of cookers 28. The holding bin stores incoming material whether cookers are ready to be loaded or not, and has shredded material ready at all times so that delay is never encountered in loading the cookers, as long as material is received from the kill floor.

At the end of a preset cooking cycle, cookers 28 discharge the heated material, now separated into free tallow and wet crackling, into trough 30. Any water included with the materials delivered to cookers 28 is boiled off and ejected as steam to the atmosphere. Side wall 32 of trough 30, on the side which receives the discharge from cookers 28, is inclined inwardly toward the bottom A plurality of perforations 34 are provided in side wall 32 and bottom wall 36. Within trough 30 and extending the length thereof near bottom wall 36 is provided a pair of spirals 38, comprising shafts carrying, respectively, right-hand and left-hand helixes. An appropriate drive system, preferably located outside and adjacent one end of trough 30, provides individual drives for spirals 38 for rotation in opposite directions. The crackling may be held for a time for stationary drainage of the tallow through perforation 34. Spirals 38 are then set in motion, causing additional tallow to drain because of the squeezing action of the spirals on the crackling.

A certain amount of small, solid particles will, of course, also pass through perforations 34 with the tallow. Drain pan 40, located directly below trough 30, receives all the material passing through perforations 34. Drain pan 40 is inclined slightly toward one corner which contains an opening 42. The liquid tallow flows across drain pan 40 and through opening 42 into a centrifuge, indicated diagrammatically at 44, wherein it is further purified. The greater part of the fines which pass through perforations 34 settle out of the tallow in drain pan 40. When a sufficient amount of fines has accumulated in drain pan 40 they may be raked over inclined side wall 46 thereof into horizontal conveyor 48 which extends the length of drain pan 40 parallel to the longitudinal axis of trough 30. At the discharge end of conveyor 48 the fines are received by inclined conveyor 50 which deposits them back into trough 30 by discharging through end wall 51 thereof. The fines are again mixed with the crackling in trough 30 through the action of spirals 38. All of the fines which pass through perforations 34 and settle in drain pan 40, or any desired portion thereof, may thus be reclaimed and mixed with the crackling before it is discharged from trough 30 for final processing. After the free tallow has been drained out the crackling and fines are discharged from trough 30 through an opening 53 in end wall 52. Conveyor 54 then transports the material to surge bin 56 which feeds screw press 58. The screw press, which may be equipped with a magnetic separator, removes any remaining moisture from the material and the dry end product may then be stored as desired.

Electrical controls may conveniently be provided for the various items of equipment so that the entire rendering operation may be controlled from one central panel. With the automated system of the present invention all raw material from the day's kill is completely processed as soon as it is provided. Such fast processing also results in higher grade tallow and dry crackling.

Since certain changes may be made in the above process and apparatus without departing from the scope of the invention herein involved, it is intended that all matter contained in the above description or shown in the accompanying drawings shall be interpreted as illustrative and not in a limiting sense.

What is claimed is:

1. Apparatus for rendering tallow comprising, in combination, at least one cooker adapted to heat the tallow-containing raw material to a temperature sufficient to liquefy the tallow therein, a first elongated container for receiving the discharge of said cooker, said container including a bottom wall and a plurality of side walls, at least one of said side walls having a plurality of perforations therein, at least two parallel screw conveyors within said container extending substantially the length thereof adjacent said bottom wall, means for causing rotation of said screw conveyors in opposite directions, a substantially flat drain pan located below said container for receiving the tallow and particles of solid material which pass through said perforations, said drain pan having an opening therein and being inclined toward said opening whereby a substantial amount of said solid material is retained in said pan as said tallow flows through said opening, and conveyor means adjacent said drain pan for transporting said solid material back to said container and depositing it therein said drain pan and said conveyor means being suitably connected to an inclined side wall, said side wall being inclined downwardly from said conveyor means to said drain pan.

2. Apparatus for rendering tallow comprising, in combination, at least one cooker adapted to heat the tallow-containing raw material to a temperature sufficient to liquefy the tallow therein, an open elongated drain trough having bottom, end and side walls, at least one of said side walls having a plurality of perforations therein and being inclined outwardly from said bottom wall to receive thereon the discharge of said cooker, a substantially flat pan located beneath said trough to receive the tallow and particles of solid material which pass through said perforations, said pan having an opening in the bottom thereof and being narrowly inclined toward said opening whereby the tallow received by said pan drains through said opening while at least a portion of said solid material settles out of said tallow and is retained in said pan, a horizontal conveyor adapted to receive said solid material which is retained in said pan and transport the same to a point adjacent one end of said trough said drain pan and said conveyor means being suitably connected to an inclined side wall, said side wall being inclined downwardly from said conveyor means to said drain pan, an inclined conveyor constructed and arranged to receive said solid material from said horizontal conveyor and discharge the same into said trough, a pair of longitudinally stationary shafts extending between said end walls of said trough adjacent said bottom wall, one of said shafts having a right-hand helix extending radially therefrom and the other of said shafts having a left-hand helix extending radially therefrom, means for rotating said shafts in opposite directions thereby moving the material in said trough toward one end thereof, and means for discharging said material from said one end.

References Cited by the Examiner

UNITED STATES PATENTS

| 1,578,245 | 3/1926 | Laabs | 260—412.6 |
| 1,766,033 | 6/1930 | Meakin | 23—280 |
| 1,791,439 | 2/1931 | Allbright | 260—412.6 |
| 1,854,270 | 4/1932 | McGilton | 260—412.6 |
| 2,035,090 | 3/1936 | Molin | 23—280 |
| 2,365,442 | 12/1944 | Anderson | 260—412 X |
| 3,158,634 | 11/1964 | Marsh | 260—412.6 |
| 3,180,880 | 4/1965 | Harrison et al. | 260—412.6 |

FOREIGN PATENTS 602,464  7/1960  Canada.

MORRIS O. WOLK, Primary Examiner.

CHARLES B. PARKER, JAMES H. TAYMAN, JR., A. H. SUTTO, Assistant Examiners.